April 21, 1964 P. S. MONROE 3,130,015
HIGH PRESSURE REACTOR
Filed Oct. 31, 1958 2 Sheets-Sheet 1

Inventor:
Paul S. Monroe
By Gerald Rose
Attorney

Inventor:
Paul S. Monroe

United States Patent Office 3,130,015
Patented Apr. 21, 1964

3,130,015
HIGH PRESSURE REACTOR
Paul S. Monroe, Chatham, N.J., assignor to Mid-Century Corporation, Chicago, Ill., a corporation of Delaware
Filed Oct. 31, 1958, Ser. No. 771,018
4 Claims. (Cl. 23—290)

This invention relates to pressure vessels, and more particularly is concerned with providing an improved vessel adapted for conducting chemical reactions involving corrosive fluids under conditions of high pressure and temperature. In a particular aspect, the invention provides a reactor vessel for conducting oxidations of organic compounds in the liquid phase with gaseous oxygen.

Chemical reactions which are conducted under high temperature and high pressure conditions and in the presence of a corrosive reaction medium pose a challenge to the construction art to provide reactors in large sizes which are capable of resisting the severe operating conditions, yet which are not so expensive that they would render the overall process economically infeasible. Low-cost construction materials such as carbon steel or low-alloy steels can contain high pressures and are useable at limited temperatures, but they are generally incapable of resisting the corrosive attack of many acids or oxidizing agents. Various metals and alloys are available which can afford protection against corrosion and may even be able to withstand elevated temperatures and pressures, but often these are prohibitively expensive when fabricating an entire reactor from the material. The indicated compromise, steel vessels lined with corrosion-resistant metallic materials, has hitherto not been successful with all liners. Welding plates or ribbons of liner material onto the inside of a steel shell, even if carefully done, may set up thermal expansion stresses and on cooling may buckle the lining. There is also the impossibility of X-raying or radiographing liner welds because of the thickness of the liner welds in comparison with the steel shell.

Another difficulty with many corrosion-resistant materials useable for reactor liners is that welding causes carbide precipitation at the grain boundaries and consequently the entire liner may require a heat treatment after extensive welding in the nature of "stabilizing anneal" or a "full anneal" to redissolve the carbides and prevent intergranular corrosion. See for example Gallaher, "Lining Pressure Vessels," Petroleum Refiner, vol. 24, No. 4, pp. 146–153, regarding the welding and annealing of Hastelloy type alloys. Quite often this heat treatment involves an annealing temperature at which carbon steel distorts, and may also call for rapid quenching in water which can lead to embrittlement of carbon steels if the lining is quenched along with the shell. Furthermore, the presence of the thick outer shell prevents rapid quenching of the thin liner.

It has previously been proposed to employ removable or replaceable liners, and while these in theory would solve many of the above difficulties, they have in practice not proved commercially attractive. If the liner is composed of several sections, sealing the different sections inside of the reactor requires custom fabrication and precision fitting which ultimately may cost more than an entire reactor built of the corrosion-resistant material. Also, whether the liner is in several sections or is of unitary construction, it is no mean problem to attach flow conduits to the liner.

An object of the present invention is to provide an improved pressure vessel having a replaceable corrosion-resistant metallic liner which is suitable for conducting reactions involving corrosive fluids under conditions of high pressure and temperature. Another object is to provide a reactor which can be fabricated from standard plates by conventional methods. A further object is to provide a reactor vessel having a removable lining which is substantially completely welded and heat treated prior to insertion in the outer shell. Yet another object is to provide a pressure vessel with a replaceable liner, both of which can be X-rayed or radiographed after all welding and fabricating of both the liner and the outer shell are completed, but before the two are assembled. A particular object is to provide a reactor suitable for conducting liquid phase oxidations of organic compounds with a molecular oxygen-containing gas. Other and more particular objects will become apparent as the description of this invention proceeds.

The objects of the present invention are attained in a reactor comprising a pressure-resistant outer shell composed of a cylindrical portion and head portions, and circumferentially divided into two segments, with one or more openings in the shell, together with a removable relatively thin unitary liner within the shell and having a massive reinforcing portion near the opening. The liner has connections integral with the liner which communicate with flow conduits through the shell openings, thereby permitting conduits to be attached directly to the liner connections, rather than to nozzles or other parts of the shell. Initially, the liner is rather loose-fitting to permit easy installation in the shell, but under service conditions of pressure and temperature it expands so as to abut against the outer shell wall, which thereafter resists the internal pressure and prevents any further unsupported expansion of the liner. Thus the high pressures and temperatures which defeated earlier attempts to use lined pressure vessels are actually employed to facilitate assembly of the present vessel. Thus the liner and the outer shell may be completely and separately prefabricated, heat treated, and tested prior to assembly, without the need for any extensive welding on either the shell or the liner after heat treatment of either part. By the employment of a unitary liner, i.e., one which is completely prefabricated into a one-piece structure, and by attaching flow conduits to connections which are integral with the liner, the problem of maintaining liner closures within the reactor is obviated completely. A reaction vessel according to the present invention, when employing a suitable corrosion-resistant liner, provides an economical reaction zone for conducting reactions such as organic oxidations where extremely corrosive fluids are encountered at elevated temperatures and pressures.

Figure 1:
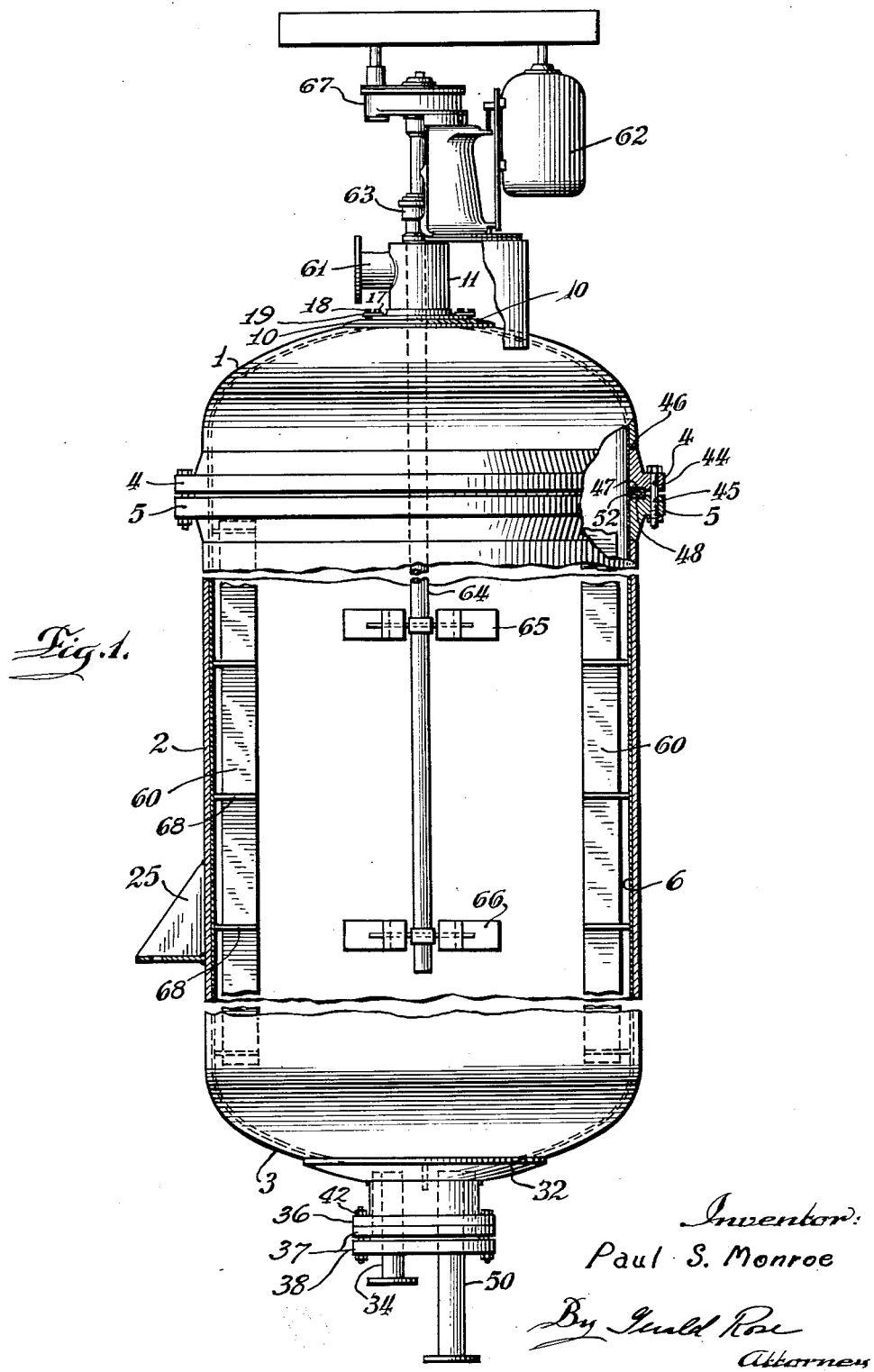
FIGURE 1 is an elevation view of a reactor vessel according to the preferred embodiment of the present invention, showing a part of the vessel and the circumferential flange detail in cross section.

Referring to the FIGURE 1, the preferred reactor vessel according to the present invention comprises a vertically elongated tubular steel portion 2 welded to ellipsoidal convex-outward dished heads 1 and 3, together with removable corrosion resistant alloy liner 6. Tubular portion 2 of the outer shell is divided about a circumference into two or more segments which are in removable flanged contact secured by flanges 4 and 5. The ends of heads 1 and 3 each have an opening, inlet 23 and outlet 49 respectively, symmetrically through their centers by means of which conduit 11 and pipes 34 and 50 are attached to liner 6 by means of connections 9 and 29.

The outer shell, i.e. the assembly of tubular portion 2 and heads 1 and 3, is fabricated from a metal such as firebox quality carbon steel which can resist the pressures and temperatures encountered in the particular service involved. The metal thickness of the cylinder and heads are in conformity with the ASME Unfired Pressure Vessel Code, and similarly the parts are welded to each other and to flanges 4 and 5 in conformity with standards established by the code. Steel flanges 4 and 5, which are hubbed or welding-neck types, are butt-welded to the shell walls as shown in the detail of FIGURE 1. The flanges are machined flat (preferably after annealing the shell) and have lapped grooves 47 and 48 whereby relatively incompressible bar rings and/or shims can be stacked in pile 52 in order to adjust the internal length of the shell to match the height of liner 6. The flanges need not be in fluid-tight relationship since, barring leakage through the liner, the corrosive reaction fluid remains confined inside liner 6. Bolts passed through oversize holes 44 and 45 permit assembly and disassembly of flanges 4 and 5; additional bolt holes spaced evenly around the flanges function in similar manner.

Figure 2:
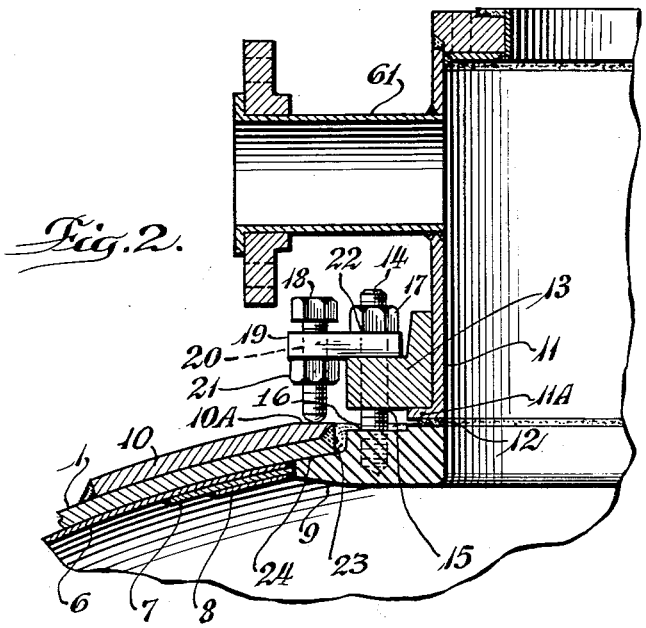
FIGURE 2 is an enlarged half sectional view of the top closure of the vessel shown in FIGURE 1.

Referring now to FIGURE 2, a detailed half section view illustrates the top closure of the reactor vessel. Head 1 of the outer chamber is perforated by round port or opening 23 which has flat sides and is concentric with the center line of the vessel. The opening is somewhat larger than the center portion of connection 9 to allow for slight misalignment. The head is reinforced by outer reinforcing plate 10 which surrounds the opening and is lap-welded at the plate's outer periphery and is butt-welded to the head at the opening. Plate 10 has its uppermost surface 10a machined flat to receive bolts 18.

Figure 3:
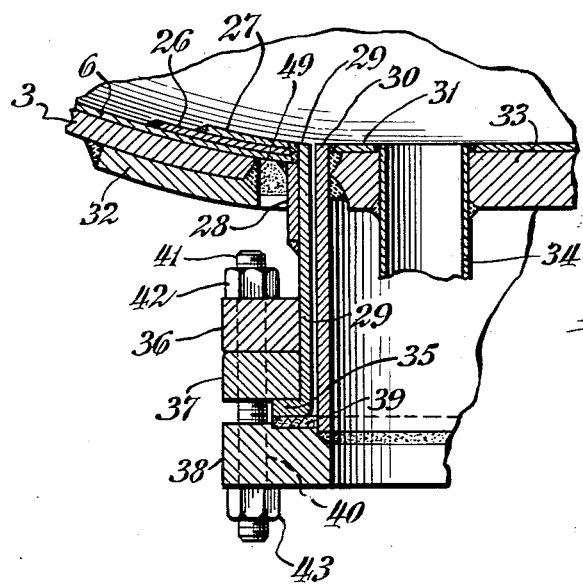
FIGURE 3 is an enlarged half sectional view of the bottom closure.

In FIGURE 3, it is seen that bottom head 3 is similarly perforated by a port or opening 49, and that head 3 is reinforced by welded reinforcing plate 32.

Fabricating the outer shell of the reactor vessel shown in FIGURE 1 is accomplished by forming and joining steel plates in the usual manner by rolling stamping, bumping, forging, welding and the like. Preferably, flanges 4 and 5 are positioned as shown in the figure, with flange 4 welded to the tubular end portion of ellipsoidal head 1 and only a short distance beyond the knuckle. This has the advantage of eliminating one circumferential weld over a design wherein flanges 4 and 5 would divide the cylindrical portion 2 of the outer shell at its midpoint even though some difficulty may be encountered in installing liner 6. Four vessel supports, represented by lugs 25, are shop-installed. The completed outer chamber is radiographed and then furnace annealed to remove welding stresses and the outer shell is ready for assembly.

Returning now to FIGURES 2 and 3: liner 6 is fabricated by forming and welding together relatively thin plates to form a unitary liner. Liner 6 is preferably monolithic, i.e. is composed of several rolled sheets or plates which are butt-welded rather than lap-welded to form a single sheet. The portions of liner 6 corresponding to heads 1 and 3 may be deformed from a single disk, while the tubular portions are welded from rolled plates. The liner is made of the particular corrosion-resistant metal or alloy selected, for example silver, tantalum, Inconel, Hastelloy C (an alloy nominally composed of 54–56% nickel, 14.5–16.5 molybdenum, 15–17 chromium, 3–4.5 tungsten and 4–7 iron), Monel (67 nickel, 30 copper, 1.4 iron, 1 manganese), 316 stainless steel, titanium, or the like. Since many of the above alloys require a full anneal or a stabilizing anneal to regain corrosion resistance after welding, the liner is heat treated prior to assembly of the reactor vessel. The thickness of liner 6 is such that it is incapable of independently withstanding either substantial internal or external pressures and hence requires lateral support from the outer shell walls. Any suitable corrosion allowance can be assigned to liner 6, depending on the anticipated rate of corrosion and on the economics between very thin liners and frequent replacement versus somewhat thicker more expensive liners but longer service life. The liner is normally relatively thin in comparison with the outer chamber walls; for example, liners may range in thickness from $\frac{1}{16}$–$\frac{3}{8}$″, while the shell walls may be from $\frac{1}{2}$ to 3″ thick. It is fabricated to a diameter within a fraction of an inch of the inside diameter of the outer shell so as to provide a loose slip fit at the annulus and to allow for some thermal and/or pressure expansion of the liner before the expansion is resisted by the outer walls. Where the vessel is to be subjected to varying pressures it is desirable that this annular tolerance be as small as possible, e.g. on the order of $\frac{1}{8}$ inch. In any event, a substantially greater tolerance is preferably avoided if possible so as to eliminate excessive stressing of liner 6 when pressure is applied, which might either rupture the liner or set up a possible stress corrosion situation. In service, liner 6 is thus in direct contact with the outer shell but is not welded thereto; it is insertible without welding and is removable without necessarily destroying the liner.

The closure shown in FIGURE 2 is comprised of connection 9 and dollar or reinforcing plates 7 and 8 welded to liner 6 and having openings axially extensive with and surrounding the hole in the liner. Connection 9 is a massive structure which is integral with liner 6 and it serves the multiple functions of reinforcing liner 6 where it is unsupported by the shell, receiving liner 6 to top head 1, and connecting conduit 11 with the vessel interior. Abrupt changes in cross section which would cause stress concentration during annealing are avoided by tapering connection 9 into liner 6 by the use of plates 7 and 8. An outer or shoulder portion of connection 9 is coaxial with and larger than opening 23 and abuts an inner surface of the outer shell wall (head 1) at 24 such that an upward force on connection 9 tends to bring the reinforcing connection 9 into rigid abutting relationship with head 1, while unreinforced portions of liner 6 are not placed under strain. Connection 9 is provided with a plurality of tapped holes 16 equally spaced about a common circumference to receive studs 14. By way of warning, holes 16 should not be drilled so deep as to leave a metal thickness less than the thickness of liner 6.

Flow conduit 11 is an expanded section of the outlet pipe and is preferably manufactured from the same corrosion-resistant alloy as liner 6 but of a greater thickness. It terminates in a flanged portion 11a which, with connection 9, communicates through opening 23 and into liner 6, and is adapted to be removably attached in sealing relationship with connection 9 either by direct contact between the two surfaces or by means of gasket 12. Conduit 11 is surrounded by flange 13 through which a series of oversize holes is drilled corresponding to holes 16 on connection 9 and through which studs 14 pass, and by means of which the conduit is brought into sealing relationship with the central portion of connection 9. A rectangular dog 19 having two oversize holes 20 and 22 is disposed over each stud 14 and under each nut 17 for the purpose of removably securing and supporting connection 9 with respect to the outer chamber wall. Thus, when bolt 18 is in place and nut 21 is advanced, flange 13 (the attaching means) is urged upward and away from the shell wall or head 1, and hence the shoulder portion of connection 9 is brought into rigid abutting relationship with the wall at 24. It is to be noted that the closure described above is but one of numerous ways in which the conduits can be removably joined to liner attachments, and while it is the preferred means, it may be changed to meet special conditions or particular services for which the vessel is to be used. It is primarily required that either the conduit 11 or the connection 9 be of lesser size than opening 23 such that the two can be attached without need for any welding after assembly of liner 6 into the shell. Other means which can removably join the conduits to the liner connections via opening 23 can be substituted for the arrangement of the figure.

Turning now to FIGURE 3, a combined manway and bottom closure is shown which is suitable for sealing the bottom conduit defined by pipes 34 and 50, pipe 30, and plate 31, to connection 29. As in the case of the upper closure, head 3 of the vessel shell has an opening 49 through which connection 29 communicates. Liner 6 is reinforced by plates 26 and 27 and by sleeve 28 which constitute a massive reinforcing section and surround the lower opening. Tubular connection 29 is formed integral with liner 6 by welding, forging or extruding and terminates in a flange portion 35; both connection 29 and flange 35 are of smaller diameter than the opening in head 3. The flange portion 35 is surrounded by two steel split flanges 36 and 37, with the splits at right angles to each other. Flanges 36 and 37 have oversize holes to receive bolt 41 and permit establishment of sealing relationship between connection 29 and conduit 30 at flange 35 by means of corrosion-resistant gasket 39. The inner diameter of connection 29 is preferably at least 18 inches so as to function as a manway and permit a welder to enter liner 6 before, and if necessary after, assembly of the reactor vessel.

Pipe 30 is insertible with a slip fit inside connection 29 and is welded to plate 31 and pipes 34 and 50. Pipe 34 is a flow conduit and may be used for example as an inlet connection and pipe 50 may be for example a vessel drain connection. Pipes 34 and 50 are braced by welded plates 33 which may be several rectangular plates of either steel or corrosion-resistant alloy. Where the conduit is sealed to flange 35 of connection 29 via gasket 39, steel flange 38 is welded to corrosion-resistant alloy pipe 30 and has a plurality of oversize holes 40 equally spaced around a common circumference and corresponding to the holes in split flanges 36 and 37. Thus bolts 41 and nuts represented by 42 and 43 permit removably joining the conduit to liner connection 29 in sealing relationship without the need for welding after the liner is once fabricated. Two additional points should be noted. Since flange 38 is protected from the liner contents by gasket 39, the flange need not be manufactured from corrosion-resistant alloy. Second, flange 35 has a diameter less than the diameter of opening 49 to permit the ready installation and removal of liner 6.

After a period of use, it will be found that liner 6 permanently expands and establishes a tight fit with the outer chamber walls, thereby rendering removal of the liner difficult. Collapsing the liner by means of applying hydraulic pressure into the annulus between the liner and the outer chamber is helpful but not always effective in freeing the liner, but the close fit may be "broken" if removal is initiated by the use of spread-bolts to forceably separate flanges 4 and 5 while liner 6 is still attached to the upper closure. Thus, a spreading force between flanges 4 and 5 tends to pull liner 6 upward along with head 1 and thereby axially away from head 3. Once the liner is freed, the liner may be pulled upward and out of the bottom segment by exerting an axial upward force on the upper head 1 or on the closure.

In the manner described above, a reactor vessel is provided which has a replaceable liner that may be installed or removed readily without welding any portion of the liner or the shell after shop fabrication and annealing.

The vessel of the present invention has particular applicability and utility for conducting liquid phase oxidations of organic compounds with an oxygen-containing gas such as air in the presence of corrosive liquid reaction media such as water or acetic acid containing oxidation catalysts. Examples of such processes are described in Belgian Patents 546,191 and 550,529. In one oxidation process, xylenes are oxidized to phthalic acids by molecular oxygen while dissolved in a saturated monocarboxylic acid solvent having from 2 to 8 carbon atoms in the molecule such as acetic acid, and in the conjoint presence of catalytic amounts of a heavy metal, either as the elemental metal or in a compound such as cobalt nitrate or manganese acetate, and a bromine-affording compound such as ammonium bromide or tetrabromoethane. For this oxidation, reaction pressures are in the range of 200 to 500 p.s.i.g. (pounds per square inch gauge) and temperatures are from 200 to 500° F. The reaction mixture is particularly vicious with respect to corrosion; acetic acid employed as a solvent is normally processed at high temperatures only in silver-lined equipment, bromides are notoriously corrosive, and air bubbled through a hot corrosive reaction mixture would lead to a corrosion rate of carbon steel on the order of inches per week. It has been found, however, that such a reaction mixture may be confined in Hastelloy C, an alloy of nickel, molybdenum, chromium, tungsten, and iron, which affords a corrosion rate of only approximately 0.030 inch per year provided there is no pitting type corrosion. The reactor of the present invention is especially suitable for this service since pitting type corrosion of Hastelloy C may be eliminated almost entirely by heat treating the lining after welding, as for example by the method shown in the Gallaher reference cited above.

The vessel design as illustrated in FIGURE 1 readily permits the carrying out of such reactions as the liquid phase air oxidation of organic compounds which involve the use of corrosive fluids. The liner 6 and its various components are preferably made of heat-treated Hastelloy C. A plurality of vertical plate baffles 60 which are attached to braces 68 and spaced a short distance from liner 6 are carried by liner 6 at several locations around its inner circumference. Baffles 60 and braces 68 are made of the alloy employed for liner 6 and are shop-fabricated and stabilization annealed with the liner prior to installation of the completed liner in the reactor. A mixer comprising motor 62, mechanical seal 63, shaft 64 and impellers 65 and 66 are attached to conduit 11 and permit rotary agitation of the reaction mixture contained within liner 6. Shaft 64, impellers 65 and 66 and mechanical seal 63 are also made of Hastelloy C.

To conduct an illustrative oxidation, a mixture of glacial acetic acid and xylenes is fed into the inner portion of the reactor vessel via line 50 until a level of approximately ⅓ the height of the reactor is reached. The mixture is at a temperature in the range of about 350° F. Catalytic amounts of ammonium bromide, cobalt acetate and manganese acetate in water are then admitted through line 50 and the line is closed off. Air under pressure is fed in through line 34 and distributed by a sparger ring, not shown, at a rate sufficient to provide an air velocity through the reactor to give about a 30–90 minute reaction time. When air is bubbled upward through the reaction mixture the latter increases in volume, and its new height reaches about ⅔ the height of the reactor vessel. Mixer motor 62 is on, which rotates impellers 65 and 66 and thereby distributes air throughout the reaction mixture. Off gases comprising nitrogen together with acetic acid and water vapors leave the reactor vessel via conduit 11 and outlet line 61 where they are cooled by an external condenser, not shown, and the condensed acetic acid liquid returned by gravity reflux through a separate line. At the conclusion of the reaction, as evidenced by a steady increase in the oxygen concentration of the gases leaving the reactor vessel, the flow of air through line 34 is discontinued and the reaction mixture withdrawn via line 50 for product work-up to recover the phthalic acids.

Additional modifications within the scope and spirit of the invention may be made to the reactor vessel in order to accommodate particular operating conditions experienced in various processes. For example, tell-tale holes may be drilled completely through the vessel's outer shell in order to reveal the presence of any corrosive fluids which may have penetrated through liner 6. The outer chamber may also be provided with one or more small fittings connected to holes extending through the outer chamber whereby fluid pressure may be exerted on a worn-out liner 6 in order to collapse the liner and thereby facilitate its removal. Also, the annulus may be continuously or intermittently flushed to wash out any leakage through liner 6.

From the description above it is manifest that a reactor according to the present invention fully satisfies the objects thereof and permits convenient shop fabrication, annealing, and inspection of all components prior to assembly of the completed prefabricated liner in the shell.

Having described the invention, what is claimed is:

1. A large size, replaceably lined, pressure vessel adaptable for conducting reactions involving corrosive fluids at elevated pressures at temperatures, which vessel comprises in combination:
   (1) a pressure-resistant outer shell having a cylindrical portion and head portions at each end of said cylindrical portion,
      (a) said outer shell being circumferentially divided into at least two segments,
      (b) at least one of said head portions having an opening therein;
   (2) a relatively-thin corrosion-resistant liner of unitary construction disposable within said shell and constructed of a metal requiring heat treating after extensive welding,
      (a) said liner covering all internal portions of said shell,
      (b) said liner being initially loose-fitting with respect to said outer shell but expansible under service conditions of pressure and temperature to provide an abutting relationship with said shell,
      (c) said liner having a massive pressure-resisting reinforcing portion near the outer shell head opening and providing an attachment for an external conduit;
   (3) and connecting means adapted for non-welded sealing of said massive reinforcing portion to an external conduit through said outer shell head opening after insertion of said liner into said shell.

2. The pressure vessel as defined in claim 1 which is further characterized in having baffle means carried by the liner, and agitation means.

3. The pressure vessel as defined in claim 1 which is further characterized in having a liner comprising an alloy of nickel, molybdenum, chromium, tungsten, and iron.

4. The pressure vessel as defined in claim 1 which is further characterized in having bar or shim means disposable between said shell segments for adjusting the axial length of said outer shell to correspond with the length of said liner.

References Cited in the file of this patent

UNITED STATES PATENTS

| | | |
|---|---|---|
| 1,440,109 | Schenck | Dec. 26, 1922 |
| 1,426,920 | Sleeper | Aug. 22, 1922 |
| 1,809,250 | Pendleton | June 9, 1931 |
| 2,245,528 | Loder | June 10, 1941 |
| 2,582,899 | Barnebey et al. | Jan. 15, 1952 |
| 2,633,414 | Boivinet | Mar. 31, 1953 |
| 2,833,816 | Saffer et al. | May 6, 1958 |